US010509715B2

United States Patent
White, Jr. et al.

(10) Patent No.: US 10,509,715 B2
(45) Date of Patent: *Dec. 17, 2019

(54) AUTOMATIC CLASSIFICATION AND PARALLEL PROCESSING OF UNTESTED CODE IN A PROTECTED RUNTIME ENVIRONMENT

(71) Applicant: Cisco Technology, Inc., San Jose, CA (US)

(72) Inventors: David C. White, Jr., Durham, NC (US); Magnus Mortensen, Cary, NC (US); Jay K. Johnston, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/957,295

(22) Filed: Apr. 19, 2018

(65) Prior Publication Data

US 2018/0239689 A1 Aug. 23, 2018

Related U.S. Application Data

(63) Continuation of application No. 15/248,077, filed on Aug. 26, 2016, now Pat. No. 9,977,725.

(51) Int. Cl.
*G06F 9/45* (2006.01)
*G06F 11/36* (2006.01)
(Continued)

(52) U.S. Cl.
CPC ...... *G06F 11/3604* (2013.01); *G06F 11/3612* (2013.01); *G06F 21/53* (2013.01);
(Continued)

(58) Field of Classification Search
CPC ............. G06F 11/3604; G06F 11/3608; G06F 11/3612; G06F 11/3624; G06F 11/624
(Continued)

(56) References Cited

U.S. PATENT DOCUMENTS 6,618,855 B1 9/2003 Lindholm et al.
6,760,903 B1 * 7/2004 Morshed ............. G06F 11/3466
717/130

(Continued)

OTHER PUBLICATIONS

Garcia-Alvarado et al, "Integrating and Querying Source Code of Programs Working on a Database" ACM, pp. 47-53 (Year: 2012).*
(Continued)

*Primary Examiner* — Anil Khatri
(74) *Attorney, Agent, or Firm* — Edell, Shapiro & Finnan, LLC (57) ABSTRACT

A system is provided to run new code modules safely in a duplicative, protected environment without affecting the code modules that are already trusted to be on the system. The system receives a new code module that validates operational data of a computing device, and instantiates a new, parallel execution engine to run the new code module on the operational data in parallel with another execution engine running the trusted/verified code modules that also validate the same operational data. The new engine runs the new code module with the operational data to produce new code module results. The production engine runs the trusted/verified code modules with the operational data to produce verified code module results. The new code module results are combined with the verified code module results to produce combined results describing the operational status of the computing device.

20 Claims, 8 Drawing Sheets

(51) Int. Cl.
*G06F 21/53* (2013.01)
*G06F 21/57* (2013.01)
*G06F 8/71* (2018.01)

(52) U.S. Cl.
CPC ............... *G06F 21/57* (2013.01); *G06F 8/71* (2013.01); *G06F 2221/033* (2013.01)

(58) Field of Classification Search
USPC .................................................. 717/125–131
See application file for complete search history.

(56) References Cited

U.S. PATENT DOCUMENTS

| | | | | |
|---|---|---|---|---|
| 7,055,130 | B2* | 5/2006 | Charisius | G06F 8/20 717/108 |
| 7,720,939 | B1* | 5/2010 | Leroy | G06F 9/44589 709/220 |
| 7,769,964 | B2* | 8/2010 | Newburn | G06F 9/30003 711/146 |
| 7,953,980 | B2* | 5/2011 | Schluessler | G06F 21/54 711/216 |
| 8,006,233 | B2* | 8/2011 | Centonze | G06F 21/57 717/125 |
| 8,037,453 | B1* | 10/2011 | Zawadzki | G06F 11/368 717/107 |
| 8,099,718 | B2* | 1/2012 | Nagabhushan | G06F 21/53 717/127 |
| 8,230,477 | B2* | 7/2012 | Centonze | H04L 63/102 717/126 |
| 8,291,183 | B2* | 10/2012 | McCloskey | G06F 11/1453 711/112 |
| 8,356,351 | B2* | 1/2013 | Fu | G06F 21/53 713/156 |
| 8,370,812 | B2* | 2/2013 | Feblowitz | G08G 1/09 717/105 |
| 8,464,204 | B1* | 6/2013 | Thornton | G06F 11/3608 717/100 |
| 8,639,625 | B1* | 1/2014 | Ginter | G06F 21/10 705/50 |
| 8,856,726 | B2* | 10/2014 | Conrad | G06F 8/35 717/104 |
| 8,869,113 | B2* | 10/2014 | Li | G06F 11/3684 717/118 |
| 8,887,156 | B2 | 11/2014 | Chambers et al. | |
| 9,860,155 | B1* | 1/2018 | Segel | H04L 43/50 |
| 10,262,310 | B1* | 4/2019 | Lobb | G06Q 20/00 |

OTHER PUBLICATIONS

Dhaliwal et al, "Recovering Commit Dependencies for Selective Code Integration in Software Product Lines", IEEE, 202-211 (Year: 2012).*

Menninghaus et al, "Towards Using Code Coverage Metrics for Performance Comparison on the Implementation Level", ACM, pp. 101-104 (Year: 2016).*

Harkema et al, "Performance Monitoring of Java Applications", ACM, pp. 114-127 (Year: 2002).*

MacMullan et al, "A Comparison of Known Codes, Random Codes, and the Best Codes", IEEE, 3009-3022 (Year: 1998).*

Mohamed et al, "Performance and Dependability Evaluation of Distributed Event-based Systems: A Dynamic Code-injection Approach", ACM, pp. 349-352 (Year: 2017).*

"ECMAScript parsing infrastructure for multipurpose analysis", esprima, https://www.npmjs.com/package/esprima [May 19, 2016 4:27:12 PM], 3 pages.

* cited by examiner

AUTOMATIC CLASSIFICATION AND PARALLEL PROCESSING OF UNTESTED CODE IN A PROTECTED RUNTIME ENVIRONMENT

CROSS REFERENCE TO RELATED APPLICATIONS

This application is a continuation of U.S. patent application Ser. No. 15/248,077, filed Aug. 26, 2016, entitled "Automatic Classification and Parallel Processing of Untested Code in a Protected Runtime Environment," the entire contents of which are hereby incorporated by reference.

TECHNICAL FIELD

The present disclosure relates to software code integration.

BACKGROUND

In a modern software development and operations system, software program code is pushed to production at a rapid pace. Maintaining stability of the system, while incorporating constant changes in the code, presents challenges. In a closed development environment, the risk of upsetting stability is minimized, since only experienced developers are working on the project and contributing code. Experienced developers will typically understand the implications of the code additions they are making and know how to test the code to minimize unintended side effects.

In a more open development environment, a crowd of inexperienced coders may contribute code modules to the operational system. Most companies do not allow untrusted code modules from inexperienced coders to be entered directly into their production systems, so as to prevent a poorly functioning code module from crashing the entire system. However, this delays the progress of the inexperienced coders and negates the immediate contributions that their code modules could make to the system. Tools are available that validate code syntax to ensure that a new code module functions without crashing or that the code follows certain syntactical requirements. Runtime profiling may help to find bottlenecks in the code, but does not provide context of the output of the code module when it is done.

DESCRIPTION OF EXAMPLE EMBODIMENTS

Overview

A computer implemented method is provided to run new software program code modules safely in a duplicate execution environment without affecting the code modules that are already trusted to be on the system. The system receives at least one new code module that processes operational data of at least one computing device. At least one duplicate engine is instantiated to run the at least one new code module on the operational data in parallel with a production engine running a plurality of trusted/verified code modules that process that same operational data. The method further comprises running the at least one new code module on the at least one duplicate engine with the operational data to produce new code module results. The plurality of trusted/verified code modules are each run on the production (i.e., trusted/verified) engine with the operational data to produce verified code module results. The new code module results are combined with the verified code module results to produce combined results describing an operational status of the computing device.

Detailed Description

Presented herein are techniques to determine that new software program code modules are untested and take different actions on the code module to ensure that it does not affect the stability of the overall system. The techniques presented still allow the code module to run with production data, and the results of the code modules to be displayed with the results of the trusted code modules. The system presented herein allows a crowd of inexperienced coders to contribute new content without negatively impacting the production operation of the system, while still operating in real time on the production data of the system.

In one example, the techniques presented herein may be implemented in an automated problem detection and alerting system. At the heart of the system is an engine which receives data from a plurality of devices (e.g., configuration information/diagnostic data from a router, a support file of the current operating state from a computing device, logs from a network switch, etc.), and processes the data as input for code modules that test and inspect the data for problems in the devices. The operational data may be gathered at each device by a user or administrator and sent (e.g., emailed, uploaded to a website, etc.) to the system for processing by the code modules. In another example, the operational data is automatically collected on the device and periodically sent to the system for processing. The operational data may be grouped into a single file or may be processed as a group (e.g., a zipped file of multiple types of operational data).

The code modules may be in the form of software program scripts, such as Python™ scripts. The scripts are typically run in parallel on the engine, with each script looking for a different problem in the input data set. In one example, the scripts are coded to look for issues with software configuration or hardware settings in the device that generated the input data set. The scripts output any issues found in the data set back to the engine, which presents the issues to a user (e.g., via a web interface, email, etc.) or a machine/software system (e.g., via an API, or other machine to machine interface). Any of the scripts may return a null set of results, indicating that the issue targeted by the script was not a problem in this particular input data set.

In another example, code modules that look for similar issues in the operational data (e.g., security flaws) may be grouped and tagged with indicators of the corresponding issue. Additionally, code modules that operate on data sets from similar devices (e.g., routers, network switches, etc.) may be grouped and tagged with indicators of the corresponding device.

To gather input from a wide range of users that interact with the system, it is open for anyone to create new code modules regardless of their experience with coding. Additionally, the new code modules are added to the system's processing right away, without being subjected to a manual review period by a human. A manual review process would slow down the development and decrease the contribution and satisfaction of the coders. The techniques presented herein prevent code modules from coders of unknown skill from destabilizing, crashing, or otherwise affecting the operation of the entire system.

This system allows multiple users to contribute multiple pieces of code to a project. New code contributions may be automatically marked as untrusted. All untrusted code is executed in a parallel engine, isolated from impacting the main execution engine. Results from the untrusted code execution may be merged with the results from the execution of trusted code. Untrusted code may be monitored for stability (e.g., does it crash?), performance (e.g., execution time), output (e.g., does it generate too much output data?), and/or side effects (does the execution affect the engine itself?). Only after a significant number of execution runs on different input data without issue is the new code determined to be trusted. Untrusted code with issues remains marked as untrusted, and the code author may be notified to fix the issues detected. The administrator of the system may also be notified of the issues with the untrusted code to prevent further impact on the system.

Figure 1:
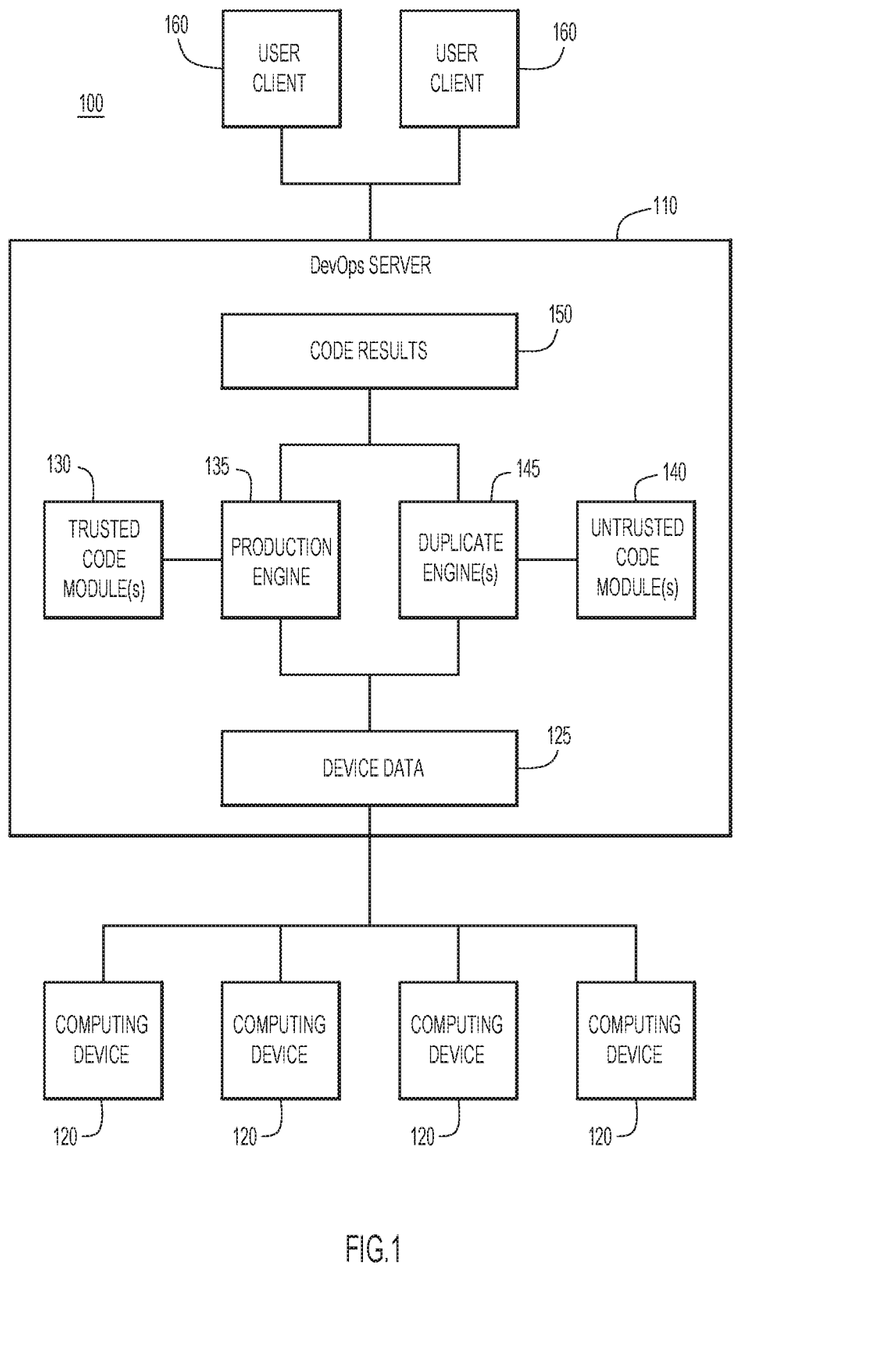
FIG. 1 is a simplified block diagram of development and operations system, according to an example embodiment.

Referring now to FIG. 1, a simplified block diagram of a development and operations (DevOps) system 100 is shown. DevOps system 100 includes a DevOps server 110 in communication with a plurality of devices 120 that are being tested for issues. The server 110 collects device data 125 from each the plurality of devices 120 to provide input in determining if any issues exist in the devices 120. The server 110 uses the device data 125 as input for a plurality of trusted code modules 130 that are run independently on a production engine 135. The server 110 uses the same device data 125 as input for one or more untrusted code modules 140 that are run on a duplicate engine 145. The trusted code modules 130 and the untrusted code modules 140 generate results which are merged to generate code results 150. The code results 150 may be displayed on one or more user clients 160, and the users at the user clients 160 may address any issues found in the code results 150 by, for example, changing settings in one or more of the devices 120. Additionally, one or more of the untrusted code modules 140 may be submitted from a user client 160.

In one example, any new code module added to the system 100 is marked as "untrusted." When the server 110 needs to run an untrusted code module 140, it instantiates a new, parallel instance, of the duplicate engine 145 as a clone of the production engine 135 and assigns the untrusted mode module 140 to the duplicate engine's 145 execution list. The duplicate engine 145 receives the same device data 125 as the production engine 135, and any untrusted code modules 140 may be executed in parallel on the duplicate engine 145. A plurality of untrusted code modules 140 may be executed on the same duplicate engine 145. Alternatively, a separate duplicate engine 145 may be instantiated for each untrusted code module 140 to isolate which untrusted code module 140 presents problems for its duplicate engine 145. Any output from the untrusted code modules 140 are merged with the results from the trusted code modules 130.

The operation and output of the untrusted code module 140 are monitored by the server 110 to detect problems with running the untrusted code module 140, such as long-running code modules, verbose output, in addition to any crashes of the untrusted code module 140 or the duplicate engine 145. Any issues detected in the operation or output of the untrusted code modules 140 will be saved by the server 110. Only after an untrusted code module 140 has been successfully run a significant number of times (e.g., 100) against varied input will the server 110 mark the untrusted code module 140 as a trusted code module 130. As a trusted code module 130, the formerly untrusted code module 140 will no longer be required to execute on its isolated, duplicate engine 145, and will be executed on the main production engine 135.

While one server 110 is shown in FIG. 1, the DevOps system 100 may be implemented in any number of computing devices, which may be interconnected via a computer network. Additionally, any number of devices 120 may be tested by the code modules in the DevOps system 100, and any number of user clients 160 may be implemented. As such, any specific number of components shown in FIG. 1 is a non-limiting example, and the function of each component may be implemented in more or fewer devices than shown in FIG. 1.

Figure 2A:
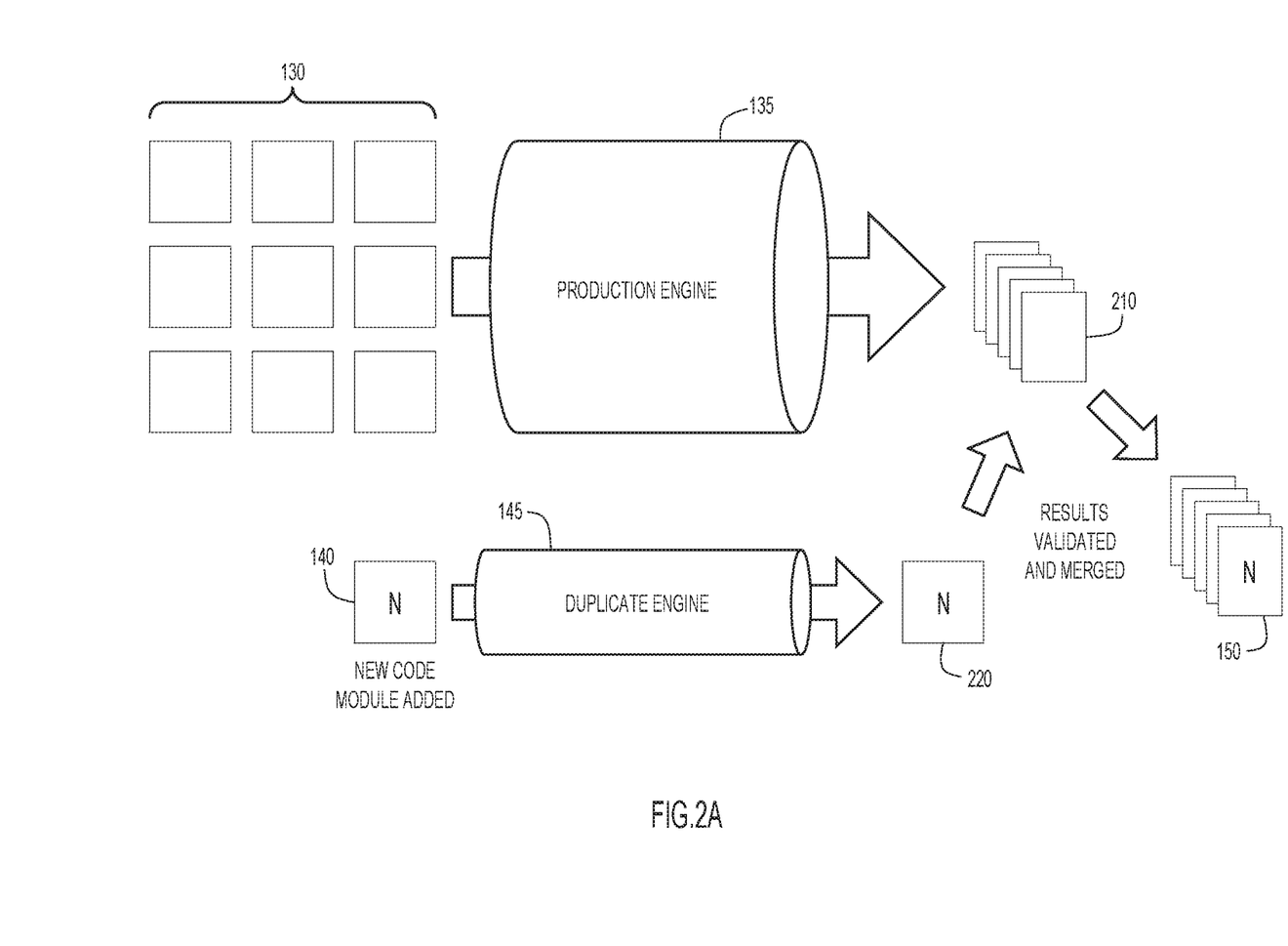
FIG. 2A is a diagram illustrating the addition of a new code module to run on a parallel execution engine, according to an example embodiment.

Referring now to FIG. 2A, a diagram illustrates one visualization of the DevOps system 100 in which a new code module is added. Trusted code modules 130 are run on production engine 135 to generate results 210. When the new (untrusted) code module 140 is added to the system, the duplicate engine 145 is instantiated as a clone of the production engine 135. The new code module 140 is run on the duplicate engine 145 to produce results 220. After the results 220 are validated they are merged with the results 210 from the production engine 135 to form the complete results 150. In this way, the new code module 140 is run under the same conditions as the trusted code modules 130. If the new code module 140 functions properly, then the combined results 150 will be the same as if all of the code modules were run on the same engine. However, if the new code module 140 fails (e.g., crashes the duplicate engine 145, produces excessive output data, runs for an excessive amount of time, etc.) then the output 210 from the trusted code modules 130 is unaffected.

Figure 2B:
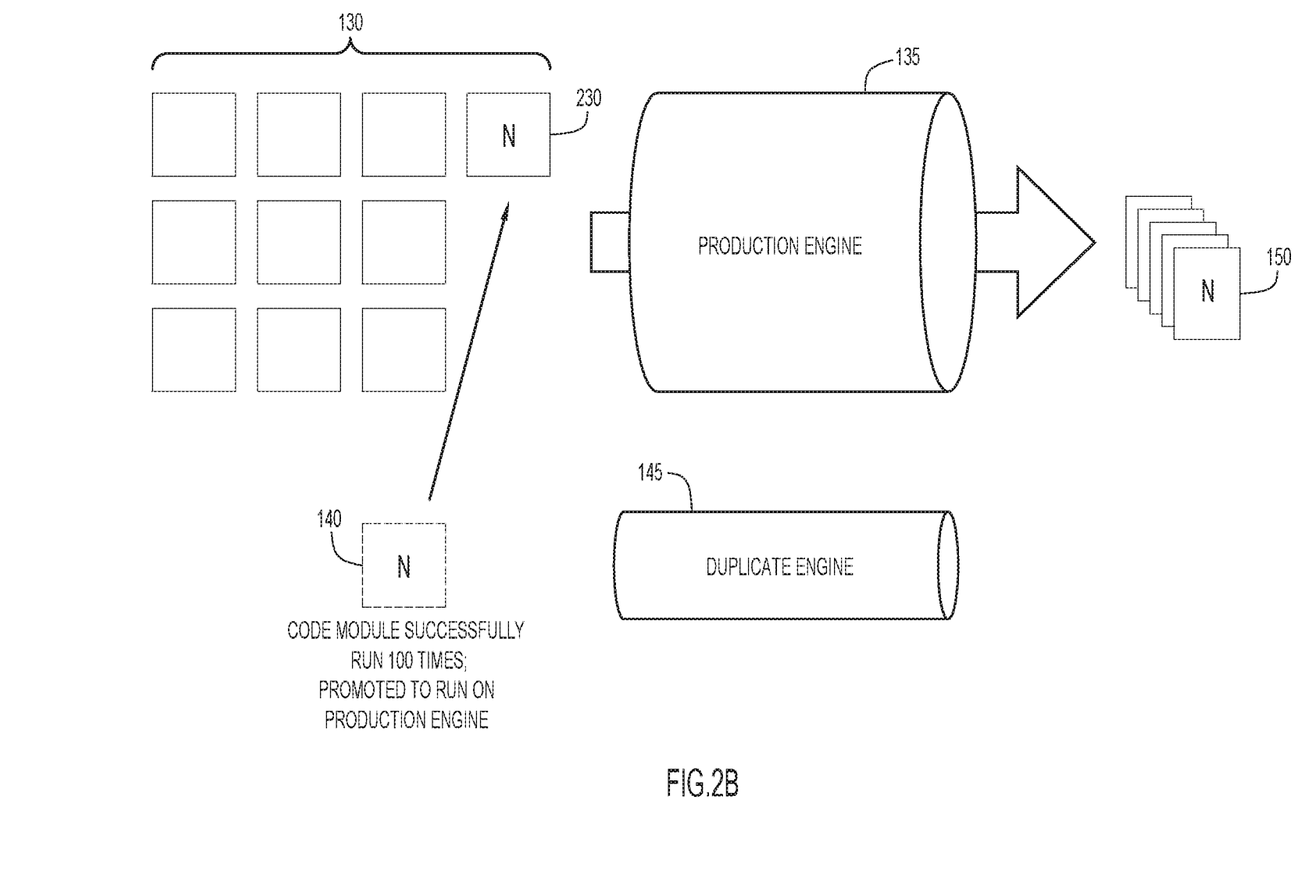
FIG. 2B is a diagram illustrating the promotion of the new code module after successfully running on the duplicate engine, according to an example embodiment.

As shown in FIG. 2B, after the new code module 140 has been successfully run on the duplicate engine 145 long enough to meet a predetermined criterion, the new code module 140 is promoted to a trusted code module 230. The trusted code module 230 is added to the rest of the trusted code modules 130 and subsequently run on the production engine 135. Since there are no more untrusted code modules to run, the duplicate engine 145 may be deleted/destroyed (or not instantiated) and the production engine 135 generates the results 150.

In one example, the predetermined criterion for a new code module 140 to be promoted to be trusted code module 230 includes running the new code module a predetermined number (e.g., 100) times using a varied set of input data with acceptable output and operation performance. In some cases, the identity of the author of the new code module 140 may affect the criterion used to promote the new code module 140. For instance, a new code module 140 written by a user who has previously contributed significantly to the trusted code modules 130 may require fewer (e.g., 50) successful runs on the duplicate engine 145. In another instance, a new code module 140 from an author with a particular job title (e.g., software developer) may require fewer successful runs than a new code module 140 from an author with a different job title (e.g., network engineer).

Figure 3A:
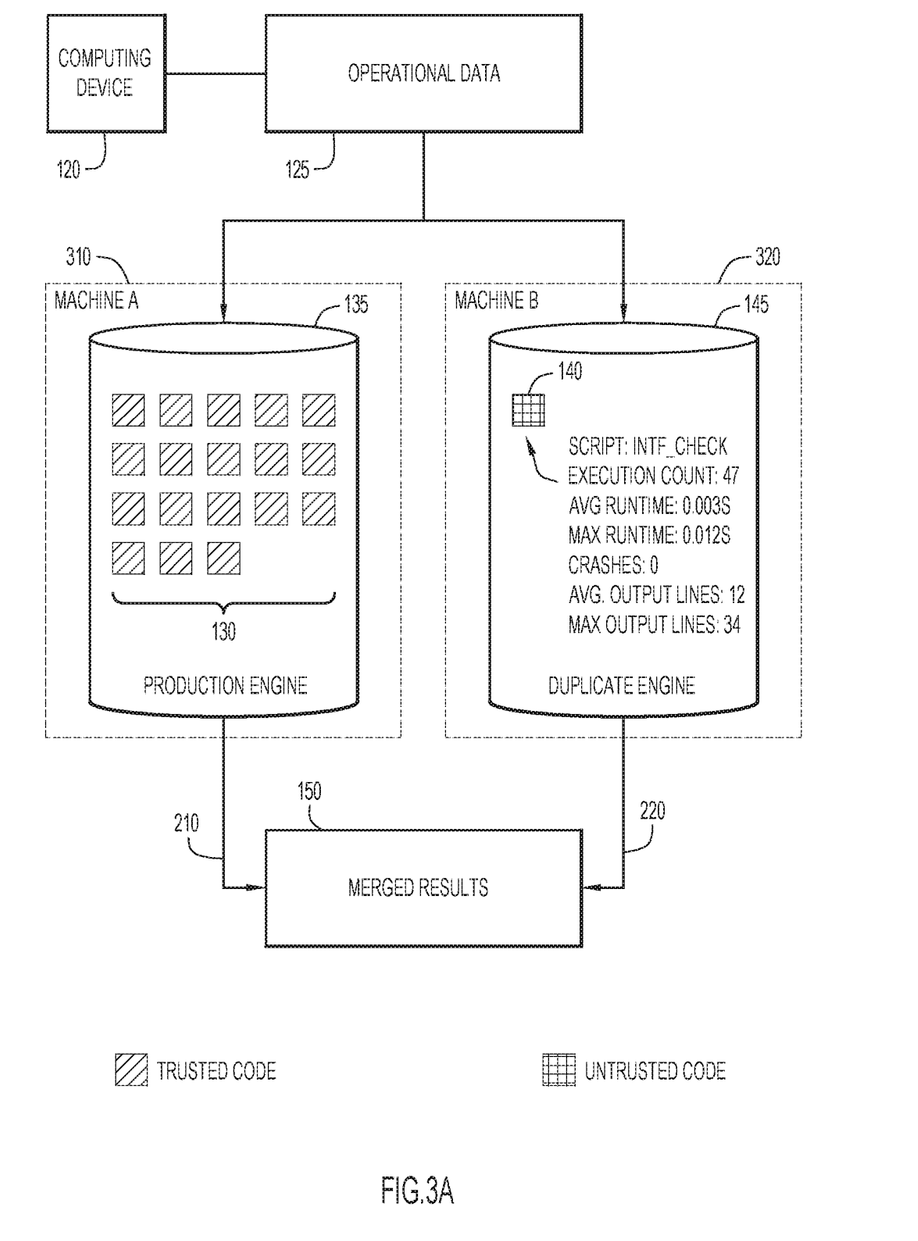
FIG. 3A is a diagram illustrating an untrusted code module running on a parallel execution engine, according to an example embodiment.

Referring now to FIG. 3A, a diagram shows another visualization of the DevOps system 100 in which a new code module is added. The operational data 125 gathered from the computing device 120 is supplied to the production engine 135 on a first machine 310 (e.g., machine A). The trusted code modules 130 run on the first machine 310 with the operational data 125 to generate results 210.

When a new/untrusted code module 140 is added to the system, the duplicate engine 145 is instantiated on a new machine 320 (e.g., machine B) to run the new code module 140. The same operational data 125 is supplied to the duplicate engine 145, which runs the new code module 140 to generate results 220. The results 220 are merged with the results 210 from the trusted code modules to form merged results 150, which may be presented to a user. Machine 310 and machine 320 may be separate physical or virtual machines.

The duplicate engine 145 monitors the performance of the untrusted code module 140 to determine when it may be appropriate to promote the untrusted code module 140 to be a trusted code module. In the shown in FIG. 3A, the untrusted code module 140 is a script name "INTF check" which has been executed 47 times on different sets of operational data 125. The duplicate engine 145 has measured the average runtime of the untrusted code module to be 0.003 seconds, and the maximum runtime to be 0.012 seconds. Additionally, none of the 47 executions of the untrusted code module 140 has crashed the duplicate engine 145. As a measure of the output generated by the untrusted code module 140, the duplicate engine 145 has produced an average of 12 output lines per execution, with a maximum of 34 output lines. Additional or alternative indications of the performance (e.g., size of the output lines, processing cycles used, etc.) of the untrusted code module 140 may also be measured by the duplicate engine 145.

In one example, multiple untrusted code modules 140 may be run on the same duplicate engine 145 in parallel. Alternatively, each time a new code module 140 is added to the system a new duplicate engine 145 is instantiated, and each untrusted code module 140 is run on its own duplicate engine 145. Additionally, a combination of these approaches may be used to run a plurality of untrusted code modules 140 on a plurality of duplicate engines 145, with each duplicate engine 145 running one or more untrusted code modules 140.

Figure 3B:
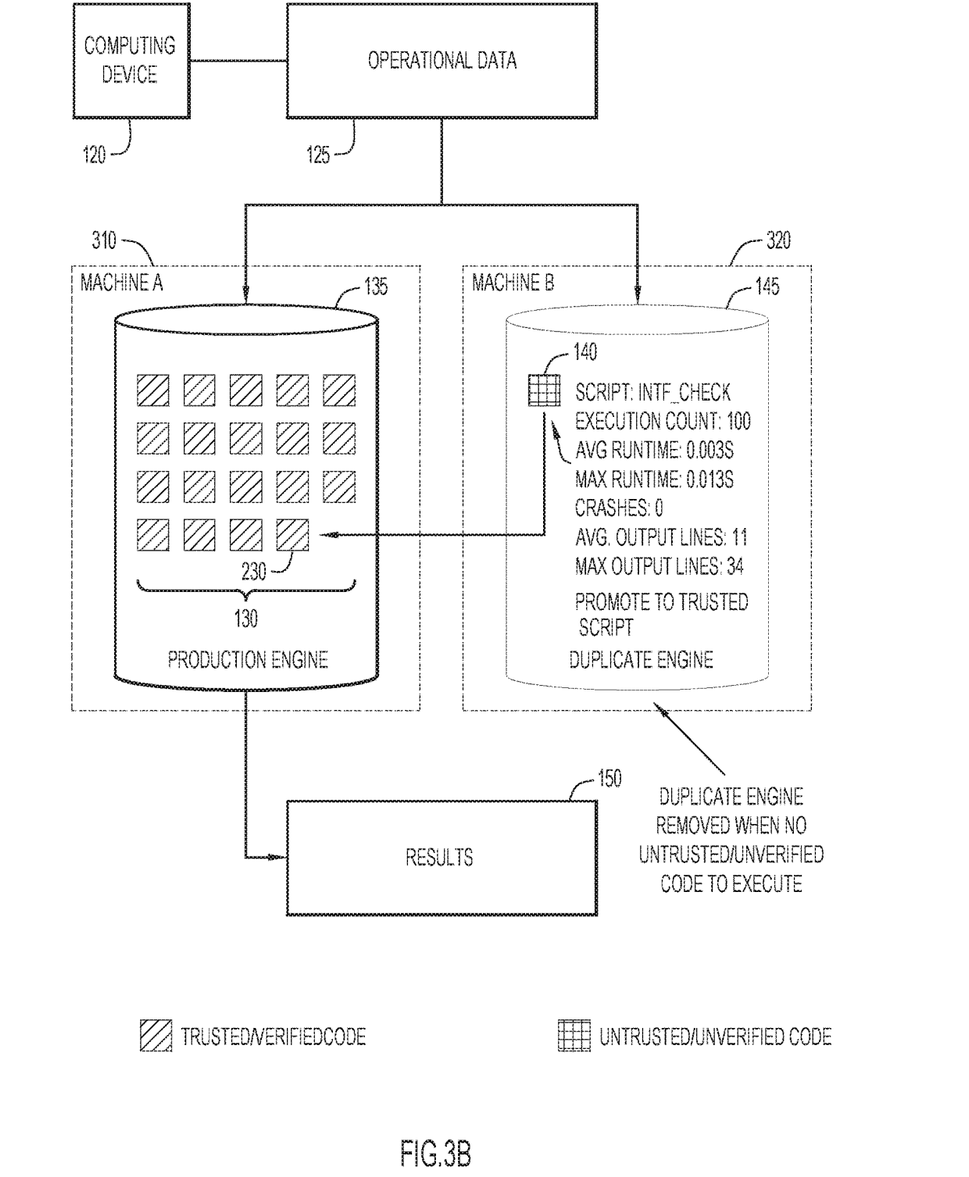
FIG. 3B is a diagram illustrating the promotion of the untrusted code module to trusted status, according to an example embodiment.

As shown in FIG. 3B, after the untrusted code module 140 has been run a predetermined number of times (e.g., an execution count of 100) with acceptable performance values (e.g., average runtime <0.01 seconds, maximum runtime <0.05 seconds, zero crashes, average number of output lines <20, and maximum number of output lines <100, etc.), then the system promotes the untrusted code module 140 to be a trusted code module 230. The trusted code module 230 is added to the plurality of trusted code modules 130 and subsequently run on the production engine 130.

In one example, the duplicate engine 145 may be removed, or not instantiated, if there are no more untrusted code modules 140 to be run. Additionally, if the machine 320 is a virtual machine, it may also be removed when the duplicate engine 145 is removed. In being removed, the duplicate engine 145 may be destroyed. Alternatively, the duplicate engine 145 and/or machine 320 may be idled without being completely destroyed until a new untrusted code module 140 is added to the system.

The specific numbers described in FIGS. 3A and 3B, i.e., the execution counts, average/maximum runtime and/or output lines, are merely examples for the illustration of the concept. Additionally, the thresholds described for promotion of an untrusted code module to a trusted code module may also vary in type of measured quantity as well as the specific values of the measured quantities described with respect to the example.

Figure 4:
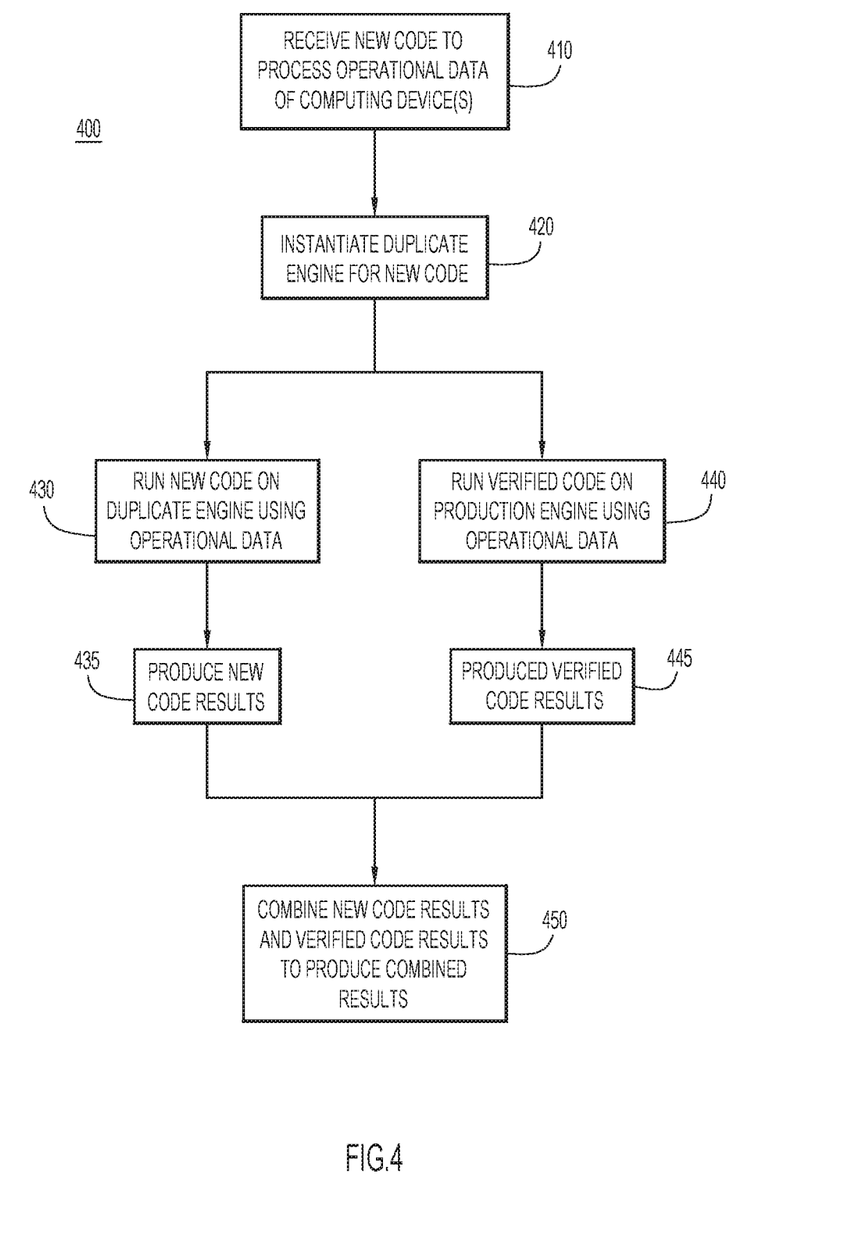
FIG. 4 is a flow chart illustrating the operations performed by a server to automatically process new code modules on a duplicate engine and combine the results with results from the production engine, according to an example embodiment.

Referring now to FIG. 4, a flowchart is shown that illustrates operations in a code module addition process 400 performed by a computing system (e.g., DevOps server 110) in adding a new code module 140 to the DevOps system. In step 410, a new code module 140 is received at the DevOps server 110. In one example, the new code module 140 processes operational data derived from a plurality of computing devices. The receipt of the new code module 140 causes a duplicate engine to be instantiated in step 420. The duplicate engine is a clone of the production engine that runs the trusted/verified code modules.

The new code module 140 is run on the duplicate engine using the operational data from the plurality of devices in step 430. The duplicate engine 145 generates new code module results in step 435 from the new code module 140 acting on the operational data. In parallel to the duplicate engine, the production engine runs the plurality of verified code modules in step 440. The production engine generates verified code module results in step 445 from the verified code modules acting on the same operational data. In step 450, the new code module results and the verified code module results are merged to generate combined results.

By performing process 400, the system is able to allow a plethora of inexperienced and experienced coders to contribute code modules to the same overall system, and have their contributions execute immediately on real-world, production data to produce actionable results. Additionally, the output results of their code modules contribute to the operation of the production engine, without being able to negatively impact the operation of the production system.

Figure 5:
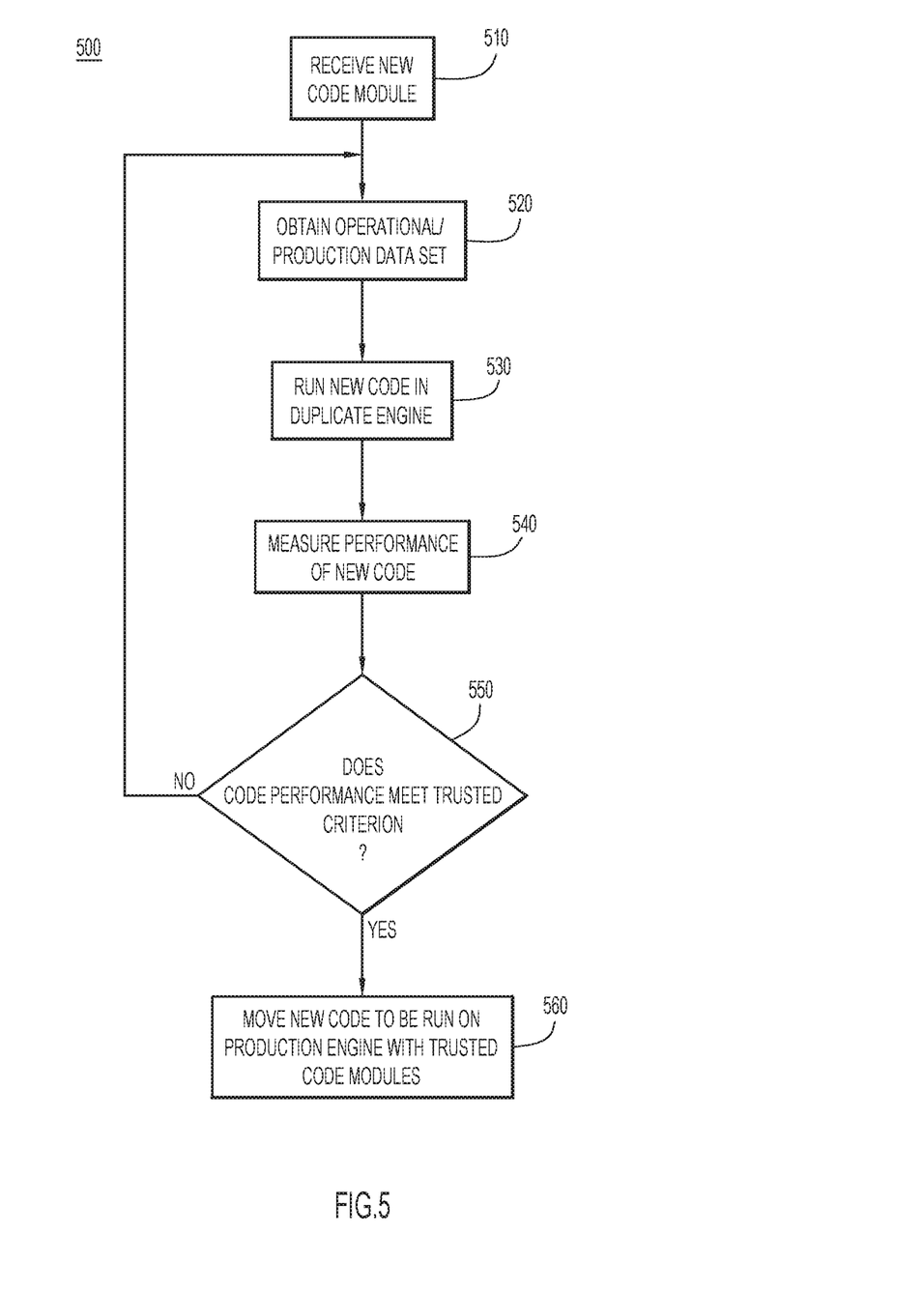
FIG. 5 is a flow chart illustrating the operations performed by a server in determining if a new code module is safe to run on the production engine, according to an example embodiment.

Referring now to FIG. 5, a flowchart is provided that illustrates operations in a code module addition process 400 performed by a computing system (e.g., DevOps server 110) in adding a new code module 140 to the DevOps system. In step 510, the system receives a new code module to operate on operational data from a plurality of devices. In step 520, the system obtains a set of operational/production data, e.g., gathered from a plurality of devices to be tested. The system runs the new code module in a duplicate engine in parallel with the production engine in step 530. The duplicate engine measures the performance of the new code module in step 540. In one example, the measured performance may include a number of executions of the new code module, running time values for the new code module, whether the new code module crashes the duplicate engine, and the number of output lines of the new code module. If the performance of the new code module meets a predetermined criterion, as determined in step 550, then the new code module is promoted to be a trusted code module and is moved to be run on the production engine with the other trusted code modules in step 560. If the performance of the new code module does not meet the predetermined criterion, e.g., it has not been executed enough times, then the system returns to step 520 and obtains a new set of production data before running the new code module again.

The process 500 provides the capability of automatically testing and validating new code modules and marking code modules as trusted only after the new code module has been proven on real-world production data. The new code module can be promoted to be a trusted code module after it has been shown to operate within specified bounds, e.g., for execution, output, and/or resources.

Figure 6:
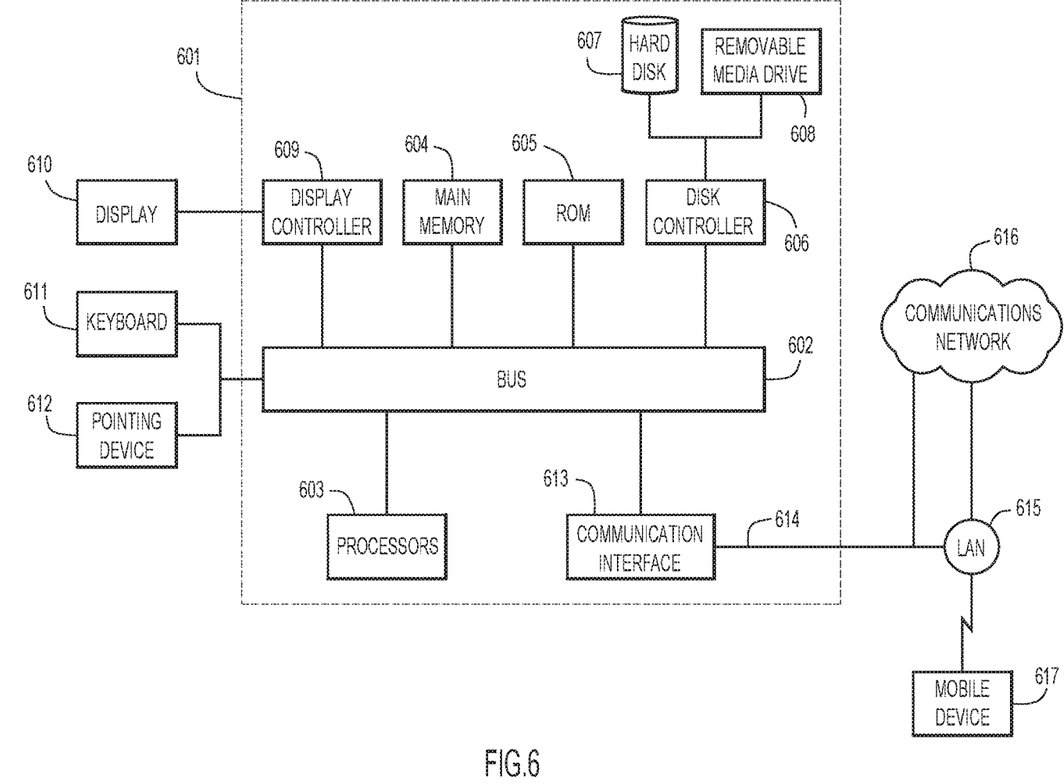
FIG. 6 is a simplified block diagram of a device that that may be configured to perform methods presented herein, according to an example embodiment.

Referring now to FIG. 6, an example of a computer system 601 (e.g., DevOps server 110, etc.) upon which the embodiments presented may be implemented is shown. The computer system 601 may be programmed to implement a computer based device, such as a DevOps system. The computer system 601 includes a bus 602 or other communication mechanism for communicating information, and a processor 603 coupled with the bus 602 for processing the information. While the figure shows a single block 603 for a processor, it should be understood that the processors 603 may represent a plurality of processing cores, each of which can perform separate processing. The computer system 601 also includes a main memory 604, such as a random access memory (RAM) or other dynamic storage device (e.g., dynamic RAM (DRAM), static RAM (SRAM), and synchronous DRAM (SD RAM)), coupled to the bus 602 for storing information and instructions to be executed by processor 603. In addition, the main memory 604 may be used for storing temporary variables or other intermediate information during the execution of instructions by the processor 603.

The computer system 601 further includes a read only memory (ROM) 605 or other static storage device (e.g., programmable ROM (PROM), erasable PROM (EPROM), and electrically erasable PROM (EEPROM)) coupled to the bus 602 for storing static information and instructions for the processor 603.

The computer system 601 also includes a disk controller 606 coupled to the bus 602 to control one or more storage devices for storing information and instructions, such as a magnetic hard disk 607, and a removable media drive 608 (e.g., floppy disk drive, read-only compact disc drive, read/write compact disc drive, compact disc jukebox, tape drive, and removable magneto-optical drive, solid state drive, etc.). The storage devices may be added to the computer system 601 using an appropriate device interface (e.g., small computer system interface (SCSI), integrated device electronics (IDE), enhanced-IDE (E-IDE), direct memory access (DMA), ultra-DMA, or universal serial bus (USB)).

The computer system 601 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 601 may also include a display controller 609 coupled to the bus 602 to control a display 610, such as a cathode ray tube (CRT), liquid crystal display (LCD) or light emitting diode (LED) display, for displaying information to a computer user. The computer system 601 includes input devices, such as a keyboard 611 and a pointing device 612, for interacting with a computer user and providing information to the processor 603. The pointing device 612, for example, may be a mouse, a trackball, track pad, touch screen, or a pointing stick for communicating direction information and command selections to the processor 603 and for controlling cursor movement on the display 610. In addition, a printer may provide printed listings of data stored and/or generated by the computer system 601.

The computer system 601 performs a portion or all of the processing steps of the operations presented herein in response to the processor 603 executing one or more sequences of one or more instructions contained in a memory, such as the main memory 604. Such instructions may be read into the main memory 604 from another computer readable medium, such as a hard disk 607 or a removable media drive 608. One or more processors in a multi-processing arrangement may also be employed to execute the sequences of instructions contained in main memory 604. In alternative embodiments, hard-wired circuitry may be used in place of or in combination with software instructions. Thus, embodiments are not limited to any specific combination of hardware circuitry and software.

As stated above, the computer system 601 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 601, for driving a device or devices for implementing the operations presented herein, and for enabling the computer system 601 to interact with a human user (e.g., a software developer). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 601 also includes a communication interface 613 coupled to the bus 602. The communication interface 613 provides a two-way data communication coupling to a network link 614 that is connected to, for example, a local area network (LAN) 615, or to another communications network 616 such as the Internet. For example, the communication interface 613 may be a wired or wireless network interface card to attach to any packet switched (wired or wireless) LAN. As another example, the communication interface 613 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 613 sends and receives electrical, electromagnetic or optical signals that carry digital data streams representing various types of information.

The network link 614 typically provides data communication through one or more networks to other data devices. For example, the network link 614 may provide a connection to another computer through a local are network 615 (e.g., a LAN) or through equipment operated by a service provider, which provides communication services through a communications network 616. The local network 614 and the communications network 616 use, for example, electrical, electromagnetic, or optical signals that carry digital data streams, and the associated physical layer (e.g., CAT 5 cable, coaxial cable, optical fiber, etc.). The signals through the various networks and the signals on the network link 614 and through the communication interface 613, which carry the digital data to and from the computer system 601 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 601 can transmit and receive data, including program code, through the network(s) 615 and 616, the network link 614 and the communication interface 613. Moreover, the network link 614 may provide a connection through a LAN 615 to a mobile device 617 such as a personal digital assistant (PDA), laptop computer, or cellular telephone.

In summary, the system presented herein detects when new code modules are added to a modular system, and automatically spawns a duplicate execution instance for this new and untested code. These new parallel instances are still in production and receive the same input data as the original execution engine, but any issues (e.g., failures, timeouts, etc.) due to the new code module are isolated to the parallel instance, thereby sparing the original execution instance from any instability. Results from the parallel instance are merged with the results from the original execution engine and presented as a unified output. After significant execution of the new code without issue (e.g., no crashes or slowdowns) the system marks the new module as tested and stable. The system then moves, or "promotes" the code module to the original execution engine. By doing so, the system provides a way for untrusted code to execute in production without having any negative impact on the production system, while still benefitting from the newly added code.

In particular, this system allows anyone, including inexperienced coders, to contribute code modules to an execution engine, and have the code modules run in production without worrying about their new code module negatively affecting (e.g., crashing) or slowing down the production system. Any contributor can see the code execute in production in real-time, while the system is isolated from any instability their new code module may cause.

In one form, a method is provided for a server to run new code modules safely in a duplicate environment without affecting the code modules that are already trusted to be on the system. The server receives at least one new code module that processes operational data of at least one computing device. At least one duplicate engine is instantiated to run the at least one new code module on the operational data in parallel with a production engine running a plurality of trusted/verified code modules that process the operational data. The method further comprises running the at least one new code module on the at least one duplicate engine with the operational data to produce new code module results. The plurality of trusted/verified code modules are each run on the production engine with the operational data to produce verified code module results. The new code module results are combined with the verified code module results to produce combined results describing an operational status of the computing device.

In another form, an apparatus is provided comprising a network interface, a memory, and a processor. The network interface is configured to receive at least one new code module that processes operational data of at least one computing device. The processor is coupled to the network interface unit and the memory, and is configured to instantiate at least one duplicate engine to run the at least one new code module on the operational data. The at least one duplicate engine runs the at least one new code module in parallel with a production engine running a plurality of trusted/verified code modules that process the operational data. The processor is also configured to run the at least one new code module on the at least one duplicate engine with the operational data to produce new code module results. The processor also runs the plurality of trusted/verified code modules on the production engine with the operational data to produce verified code module results. The processor combines the new code module results with the verified code module results to produce combined results describing an operational status of the computing device.

In a further form, an apparatus comprising a network interface and a processor is configured to perform any of the methods described and shown herein.

In still another form, a non-transitory computer readable storage media is provided that is encoded with instructions that, when executed by a processor, cause the processor to perform any of the methods described and shown herein.

The above description is intended by way of example only.

What is claimed is:

1. A computer-implemented method comprising:
obtaining at least one new code module that processes operational data of at least one computing device;
instantiating at least one duplicate engine to run the at least one new code module on the operational data, the at least one duplicate engine executing the at least one new code module in parallel with a production engine executing a plurality of verified code modules that process the operational data;
executing the at least one new code module on the at least one duplicate engine with the operational data;
measuring a performance of the new code module executing on the duplicate engine;
determining whether the performance of the new code module meets a predetermined criterion; and
responsive to a determination that the performance of the new code module meets the predetermined criterion, adding the new code module to the plurality of verified code modules.

2. The method of claim 1, wherein the performance of the new code module includes stability of the duplicate engine, stability of the new code module, execution time of the new code module, output of the duplicate engine, or unplanned effects of the new code module on the duplicate engine.

3. The method of claim 1, further comprising notifying at least one author of the new code module of the performance of the new code module.

4. The method of claim 3, wherein the predetermined criterion for adding the new code module to the plurality of verified code modules is based on characteristics of the at least one author of the new code module.

5. The method of claim 1, wherein the predetermined criterion for adding the new code module to the plurality of verified code modules includes a predetermined number of executions of the new code module on the duplicate engine.

6. The method of claim 1, wherein the at least one new code module includes a plurality of new code modules, and each new code module of the plurality of new code modules is run on a separately instantiated duplicate engine.

7. The method of claim 1, further comprising removing the duplicate engine in response to the new code module being added to the plurality of verified code modules.

8. An apparatus comprising:
a network interface unit configured to obtain at least one new code module that processes operational data of at least one computing device;
a memory; and
a processor coupled to the network interface unit and memory, the processor configured to:
instantiate at least one duplicate engine to run the at least one new code module on the operational data, the at least one duplicate engine
executing the at least one new code module in parallel with a production engine executing a plurality of verified code modules that process the operational data;
measure a performance of the new code module executing on the duplicate engine;
determine whether the performance of the new code module meets a predetermined criterion; and
responsive to a determination that the performance of the new code module meets the predetermined criterion, add the new code module to the plurality of verified code modules.

9. The apparatus of claim 8, wherein the performance of the new code module includes stability of the duplicate engine, stability of the new code module, execution time of the new code module, output of the duplicate engine, or unplanned effects of the new code module on the duplicate engine.

10. The apparatus of claim 8, wherein the processor is further configured to cause the network interface unit to notify at least one author of the new code module of the performance of the new code module.

11. The apparatus of claim 10, wherein the predetermined criterion for adding the new code module to the plurality of verified code modules is based on characteristics of the at least one author of the new code module.

12. The apparatus of claim 8, wherein the predetermined criterion for adding the new code module to the plurality of verified code modules includes a predetermined number of executions of the new code module on the duplicate engine.

13. The apparatus of claim 8, wherein the at least one new code module includes a plurality of new code modules, and the processor is configured to instantiate a separate duplicate engine for each new code module of the plurality of new code modules.

14. The apparatus of claim 8, wherein the processor is further configured to remove the duplicate engine in response to the new code module being added to the plurality of verified code modules.

15. One or more non-transitory computer readable storage media encoded with computer executable instructions operable to cause a processor to:
obtain at least one new code module that processes operational data of at least one computing device;
instantiate at least one duplicate engine to run the at least one new code module on the operational data, the at least one duplicate engine executing the at least one new code module in parallel with a production engine executing a plurality of verified code modules that process the operational data;
measure a performance of the new code module executing on the duplicate engine;
determine whether the performance of the new code module meets a predetermined criterion; and
responsive to a determination that the performance of the new code module meets the predetermined criterion, add the new code module to the plurality of verified code modules.

16. The computer readable storage media of claim 15, wherein the performance of the new code module includes stability of the duplicate engine, stability of the new code module, execution time of the new code module, output of the duplicate engine, or unplanned effects of the new code module on the duplicate engine.

17. The computer readable storage media of claim 15, further comprising instructions operable to cause the processor to notify at least one author of the new code module of the performance of the new code module.

18. The computer readable storage media of claim 17, wherein the predetermined criterion for adding the new code module to the plurality of verified code modules is based on characteristics of the at least one author of the new code module.

19. The computer readable storage media of claim 15, wherein the at least one new code module includes a plurality of new code modules, and further comprising instructions operable to cause the processor to instantiate a separate duplicate engine for each new code module of the plurality of new code modules.

20. The computer readable storage media of claim 15, further comprising instructions operable to cause the processor to remove the duplicate engine in response to the new code module being added to the plurality of verified code modules.

* * * * *